P. MURRAY & F. KOCH.
Boot for Horses.

No. 126,479. Patented May 7, 1872.

126,479

UNITED STATES PATENT OFFICE.

PATRICK MURRAY AND FREDERICK KOCH, OF MORRISANIA, NEW YORK.

IMPROVEMENT IN BOOTS FOR HORSES.

Specification forming part of Letters Patent No. 126,479, dated May 7, 1872.

Specification describing a new and Improved Flexor and Extensor Boot for Horses, invented by PATRICK MURRAY and FREDERICK KOCH, of Morrisania, in the county of Westchester and State of New York.

Figure 1:
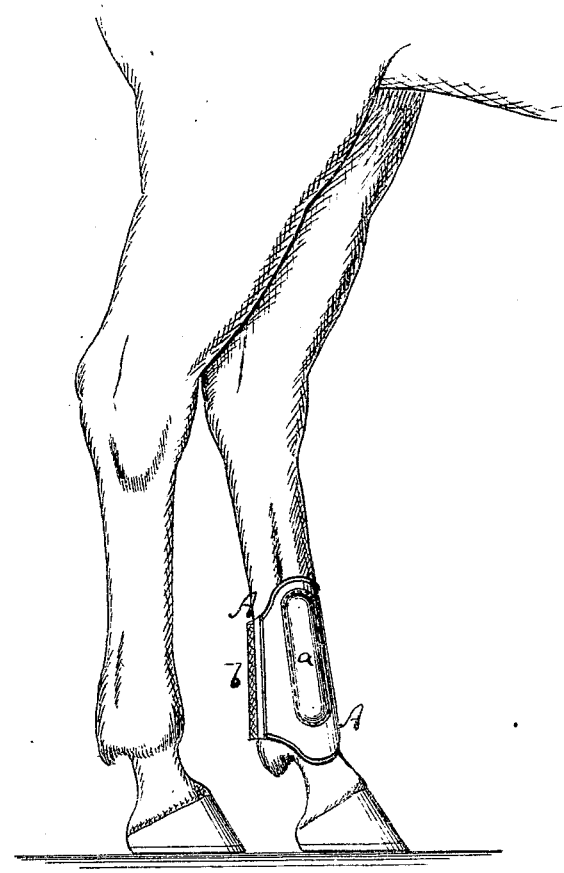
Figure 2:
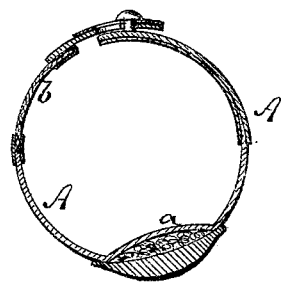

Figure 1 is a side view of our improved horse-boot. Fig. 2 is a transverse section of the same.

Similar letters of reference indicate corresponding parts.

This invention has for its object to provide a yielding but nevertheless powerful boot for horses, whereby the muscles and tendons in the lower limbs near the hoof will be protected.

In training young horses especially, it often happens that the muscles in the lower extremities become overstrained and swollen, which incapacitates the animals for all time; also, full-grown animals, under great strain, are liable to be thus injured.

Our invention consists in the new arrangement of a wide strap, which contains an elastic section and a cushion, all in such manner that the cushion will be drawn against the exposed muscles and brace or support them and prevent their swelling.

A in the drawing represents a strap, made of leather or other suitable material, long enough to fit around the horse's leg, and as wide as the section to be protected is long. A cushion, $a$, is formed in the strap, and a section, $b$, of rubber or other equivalent elastic material, also secured therein. The cushion, which is made of suitable soft material, projects on the inner side of the strap, and is, by means of the elastic, drawn against the portion of the horse's leg which is exposed to the swelling above referred to. By being thus held in contact with the parts most exposed, the cushion serves to brace or sustain such parts and to fully protect them from injury. The strap is, by buckle, buttons, or otherwise, fastened around the horse's leg. The elastic makes it also self-sustaining.

The devices can also be used as an "interfering-boot" to prevent the animals from injuring their limbs by striking them against one another.

Having thus described our invention, we claim as new and desire to secure by Letters Patent—

The strap A combined with cushion $a$ and rubber $b$, each formed on the said strap, and all applied to the limb of a horse, as and for the purpose described.

PATRICK MURRAY.
FREDERICK KOCH.

Witnesses:
JOHN J. CLARKE,
C. F. DAVIS, Jr.